(12) United States Patent
Zhang

(10) Patent No.: US 10,703,634 B2
(45) Date of Patent: Jul. 7, 2020

(54) METHOD FOR PREPARING GRAPHENE USING COAL AS RAW MATERIAL

(71) Applicant: ENN GRAPHENE TECHNOLOGY CO., LTD., Hebei (CN)

(72) Inventor: Yuhong Zhang, Tortola (GB)

(73) Assignee: ENN Graphene Technology Co., LTD., Hebei (CN)

( * ) Notice: Subject to any disclaimer, the term of this patent is extended or adjusted under 35 U.S.C. 154(b) by 253 days.

(21) Appl. No.: 15/575,297

(22) PCT Filed: May 13, 2016

(86) PCT No.: PCT/CN2016/081961
§ 371 (c)(1),
(2) Date: Nov. 17, 2017

(87) PCT Pub. No.: WO2016/184355
PCT Pub. Date: Nov. 24, 2016

(65) Prior Publication Data
US 2018/0155201 A1    Jun. 7, 2018

(30) Foreign Application Priority Data

May 19, 2015 (CN) .......................... 2015 1 0257435

(51) Int. Cl.
*C01B 32/184* (2017.01)
*C01B 32/20* (2017.01)
(Continued)

(52) U.S. Cl.
CPC ............ *C01B 32/184* (2017.08); *C01B 32/20* (2017.08); *C01B 32/348* (2017.08); *H01G 11/26* (2013.01);
(Continued)

(58) Field of Classification Search
CPC . C01B 32/184; C01B 32/348; C01B 2204/22; C01B 32/20; C01B 2204/32;
(Continued)

(56) References Cited

U.S. PATENT DOCUMENTS

| 2011/0201739 A1* | 8/2011 | Beall .................. B82Y 30/00 524/325 |
| 2013/0040283 A1* | 2/2013 | Star .................. G01N 27/127 435/5 |

(Continued)

FOREIGN PATENT DOCUMENTS

| CN | 103288076 A | 9/2013 |
| CN | 103288076 A | 9/2013 |

(Continued)

OTHER PUBLICATIONS

Zhuo, et al., Large-scale synthesis of graphene by the reduction of graphene oxide at room temperature using metal nanoparticles as catalyst, Carbon 2013; 52: 559-564 (Year: 2013).*

(Continued)

*Primary Examiner* — Daniel C. McCracken
(74) *Attorney, Agent, or Firm* — Martin & Ferraro, LLP

(57) ABSTRACT

The present disclosure relates to a method for the preparation of graphene from coal as a raw material, and more particularly to a method for the preparation of microporous graphene from Chinese Zhundong coal. The process consists of the following steps: first, refining the coal block or coal particle to get fine powdered coal; second, immersing the powdered coal with activation agent solution and drying water to get molten mixture; third, carbonizing the molten mixture in an inert atmosphere and at a high temperature to obtain the carbonized product; fourth, successively acid washing, water-washing and drying the carbonized product to obtain the coal-based porous graphene with the surface area up to 3345 $m^2/g$. The invention mainly solves the (Continued)

problems of the current method for the preparation of the microporous graphene with high specific surface area, including high cost of raw materials, complicated procedures and low yield. The porous graphene obtained by the invention is expected to realize excellent application values in the fields of gas adsorption separation, electrochemical energy storage and catalysis.

15 Claims, 8 Drawing Sheets

(51) Int. Cl.
  *C01B 32/348* (2017.01)
  *H01G 11/26* (2013.01)
  *H01G 11/32* (2013.01)
  *B82Y 30/00* (2011.01)
  *B82Y 40/00* (2011.01)

(52) U.S. Cl.
  CPC .............. *H01G 11/32* (2013.01); *B82Y 30/00* (2013.01); *B82Y 40/00* (2013.01); *C01B 2204/22* (2013.01); *C01P 2002/72* (2013.01); *C01P 2002/82* (2013.01); *C01P 2002/85* (2013.01); *C01P 2002/88* (2013.01); *C01P 2004/04* (2013.01); *C01P 2006/12* (2013.01); *C01P 2006/14* (2013.01); *C01P 2006/40* (2013.01); *Y10S 977/734* (2013.01); *Y10S 977/845* (2013.01); *Y10S 977/948* (2013.01)

(58) Field of Classification Search
  CPC . C01B 32/182; C01B 32/198; C01B 2204/00; C01B 2204/02; C01B 2204/04; C01B 2204/06; C01B 2204/065; C01B 2204/20; C01B 2204/24; C01B 2204/26; C01B 2204/28; C01B 2204/30; C01B 32/205; C01B 32/21; C01B 32/215; C01B 32/22; C01B 32/225; C01B 32/23; H01G 11/26; H01G 11/32; B82Y 30/00; B82Y 40/00; C01P 2002/72; C01P 2002/82; C01P 2002/85; C01P 2004/04; C01P 2002/88; C01P 2006/12; C01P 2006/14; C01P 2006/40; Y10S 977/734; Y10S 977/845; Y10S 977/948

See application file for complete search history.

(56) References Cited

U.S. PATENT DOCUMENTS

| | | |
|---|---|---|
| 2013/0183459 A1 | 7/2013 | Nickel |
| 2014/0044968 A1* | 2/2014 | Papakonstantinou .. B82Y 30/00 428/402 |

FOREIGN PATENT DOCUMENTS

| | | |
|---|---|---|
| CN | 103771403 A | 5/2014 |
| CN | 103771403 A | 5/2014 |
| CN | 104540778 A | 4/2015 |
| JP | 51-116194 A | 10/1976 |
| JP | 02-153813 A | 6/1990 |
| JP | 08-321306 A | 3/1996 |
| JP | 2010-092690 A | 4/2010 |
| JP | 2012-082134 A | 4/2012 |
| JP | 2012-101948 A | 5/2012 |
| JP | 2013517274 | 5/2013 |
| JP | 2013-208597 A | 10/2013 |

OTHER PUBLICATIONS

International Search Report dated Aug. 16, 2016 in related PCT Application No. PCT/CN2016/081961.
Office Action dated Dec. 30, 2018 for Japan Application No. 2017-559116 with English translation.
Office Action dated Jan. 7, 2019 for EPO Application No. 16795842.0.
Office Action dated Aug. 14, 2019 for Japan Application No. 2017-559116 with English translation.

* cited by examiner

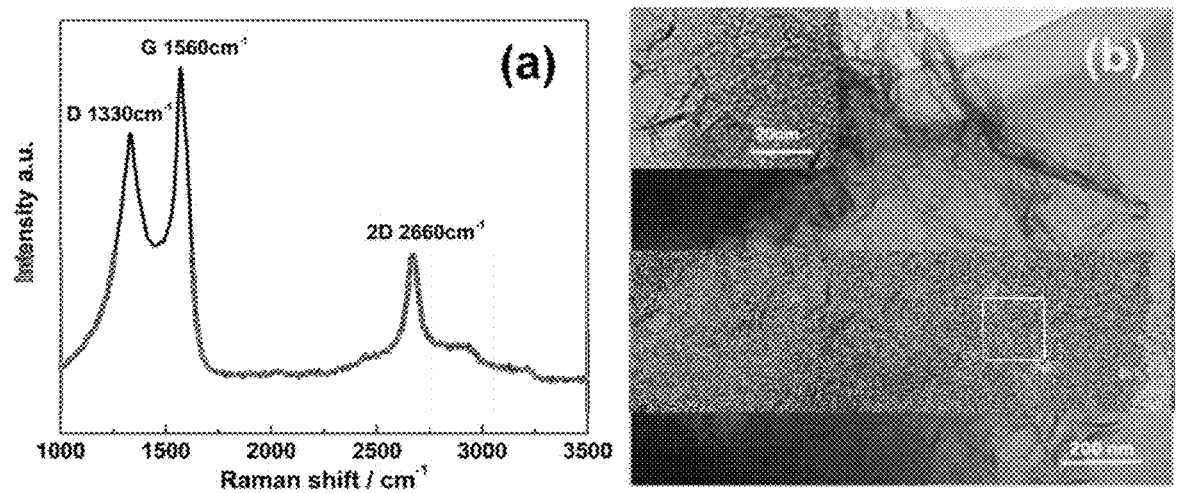
FIG. 1 (a) and (b)
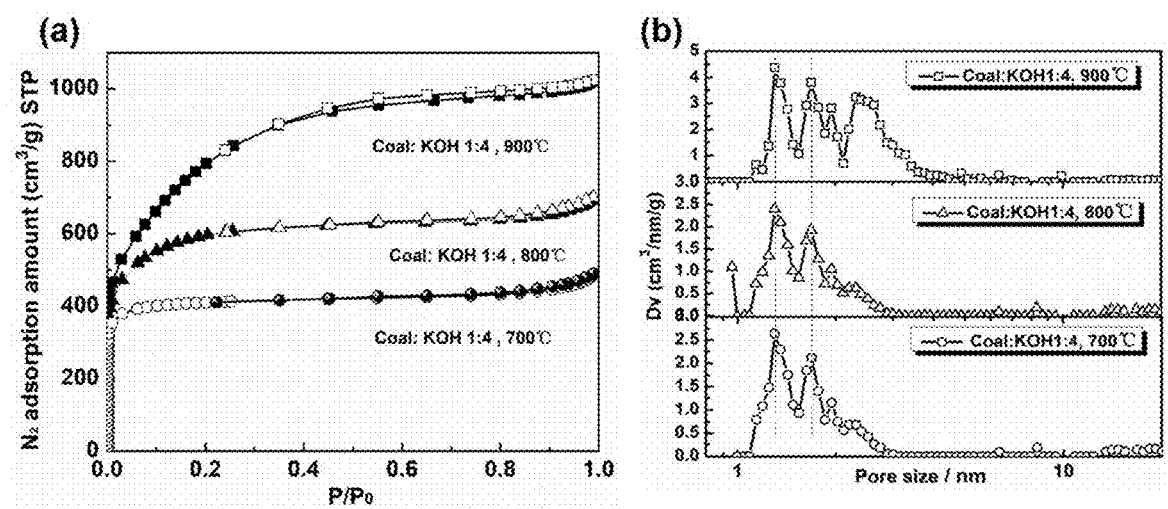
FIG. 2 (a) and (b)

METHOD FOR PREPARING GRAPHENE USING COAL AS RAW MATERIAL

TECHNICAL FIELD

The present invention relates to a method for preparing graphene, specifically a method for preparing porous graphene from coal precursor.

BACKGROUND

Graphene is a kind of two-dimensional single-layer carbon nanostructured material constructed by the bottom up assembly of $sp^2$ carbon atoms, which has great application potentials in the fields of electronic devices, sensors, nanocomposite materials and electrochemical energy storage because of its excellent conductivity, thermal conductivity, mechanical properties and chemical stability.

Porous graphene materials, possessing both the high conductivity of the graphene sheet structure and rich pore structure, show significant application values in electrochemical energy storage, especially in supercapacitors based on ion adsorption principle. At present, the preparation methods of porous graphene mainly includes chemical activation, template synthesis and carbon thermal reduction. Therein, the chemical activation method involves the activating etching of graphite or graphite oxide by KOH, $H_3PO_4$, $ZnCl_2$ or other activation agents, wherein the graphite or graphite oxide are pre-exfoliated by microwave or other chemical means. The literature [Science, vol. 332, 1537, (2011)] provided a method for preparing microporous graphene by KOH activation of microwave-exfoliated graphene oxide. The resulting microporous graphene has a surface area of 3100 $m^2/g$ and exhibits excellent organic supercapacitor performance. The template synthesis of porous graphene is based on a deposition process in which carbon source pass through the templates (MgO, ZnS, $SiO_2$, $Al_2O_3$ and so on) to form graphene layers. Subsequent template removal process gives porous graphene materials. For example, porous graphene materials with various pore features can be obtained based on catalytic deposition process which employs MgO (flaky, spherical, columnar) as the substrate template and small molecule hydrocarbons ($CH_4$, $C_2H_4$) as the gas-phase carbon source [Nat. Commun, 5, 3410 (2014)]. In addition, carbon thermal reaction can be also applied to prepare porous graphene. Such process is to use graphite oxide as raw material and oxygenated metal salts (such as $Na_2MoO_4$, $Na_2WO_4$, $Na_3VO_4$, $NaAlO_2$, $Na_2SnO_3$ and $K_2TiO_3$) as etchant in which a high temperature (650° C.) reduction reaction and subsequent pickling of metal oxide yield the porous graphene materials with pore size of 1 to 50 nm. [Nat. Commun, 5, 4716 (2014)]. However, it should be noted that all the above-mentioned preparation methods for porous graphene material suffer from bottlenecks including high cost of raw materials, time consuming procedures and mass production difficulty.

Thus, the development of low-cost, large-scale preparation methods of porous graphene material is of great significance. To achieve this purpose, it is critical to seek raw materials with low-cost and large reserves. The internal structure of coal contains a large amount of natural graphite-like structure with aromatic hydrocarbons and polyarylene as the basic unit. It has long been regarded as one of the important raw materials for large-scale and low-cost preparation of porous carbon materials. At present, the production of coal based porous carbon material from is mainly based on the carbonization and activation (physical activation or chemical activation) of bituminous coal or anthracite. Characteristics of coal, activation agent type and activation condition are the key factors influencing the pore structure of resulting porous carbons. However, the carbon framework in the coal-based activated carbon material prepared by current strategies is mainly amorphous structure, and the pores created by the physical or chemical activation method are poor (specific surface area <1500 $m^2/g$). Moreover, the heteroatom content is high, which limits its application in the efficient adsorption of gas molecules and electrochemical energy storage. Compared to other types of coal, lignite in China has a large reserve. Especially in Chinese Xinjiang Zhungeer eastern, low-grade coal resources (quasi-East lignite) has been recently found with a forecast reserves of 390 billion tons. On the one hand, lignite due to the lower degree of coalification, higher alkali metal and moisture content, greatly limits its large-scale application in the field of coal-fired power generation. On the other hand, lignite has significant advantages as raw material for preparing porous carbon materials: (1) high content of lignite volatile content, which is favorable for the formation of well-developed pore structure during pyrolysis process; (2) low degree of coalification, which makes lignite have a high reactivity and easy to convert to porous carbon materials by the regulation of carbon structure evolution and pore formation process. At present, lignite is mainly used to prepare low-quality activated coke for water treatment and removal of coal-fired flue gas. A small amount of research has been reported to prepare activated carbon with potassium-containing activation agents. Although the activated carbon with high specific surface area could be obtained, the porous carbon material was still amorphous and the heteroatom content was high.

The present invention provides a method for preparing porous graphene materials, which is low-cost and easy for large-scale industrial production. In particular, lignite with special degree of coalification and structural characteristics is used as raw material; the porous graphene material is prepared by one-step chemical activation process in which the initial the graphene-like structures and the catalytic metal compositions in coal are two factors for the formation of graphene structures. Such a preparation method of graphene material is simple, low cost and easy to be large-scale and batch production. The porous graphene prepared by the method has the advantages of well-developed pore structure, controlled specific surface area and high purity of carbon structure, which make it has great application potentials in the fields of electrochemical energy storage (Double layer supercapacitor electrode material, lithium ion capacitor cathode material) and gas adsorption ($CO_2$ adsorption, $CH_4$ adsorption).

Contents of the Invention

In order to solve the problems that the existing porous graphene preparation technology including high cost of raw material, complicated preparation process and low specific surface area, the present invention provides a method for preparing porous graphene with Chinese Zhundong coal as precursor. A simple one-step chemical activation process is employed to obtain the porous graphene material with high specific surface areas and controllable pore structure. Specifically, the invention includes the following steps:

Refining step: refining the coal block or coal particle to get fine powdered coal;

Activation step: immersing the powdered coal with activation agent solution with stirring for 10~36 h at the room temperature and drying water to get the molten mixture of the powered coal and the activation agent solution;

Carbonization step: carbonizing the molten mixture obtained in the activation step in an inert gas or a mixture of hydrogen and inert atmosphere and nature cooling to obtain the carbonized product;

Washing and drying step: successively acid washing, water-washing and drying the carbonized product to obtain the porous graphene.

Preferably, the activation solution is a solution of an alkali metal hydroxide, an alkaline earth metal hydroxide or a mixture thereof; and the activation step also comprises using ammonia as an activation agent.

Preferably, the mass ratio of the coal to the activation agent is from 1:0.1 to 1:10.

Preferably, the volume fraction of $H_2$ in the mixed atmosphere of hydrogen and inert atmosphere is 0 to 100%.

Preferably, the carbonization temperature in the carbonization step is from 500° C. to 1200° C. and the carbonation residence time is from 0 to 10 h.

Preferably, the rate of temperature rise in the carbonization step is from 0.1 to 15° C./min.

Preferably, the concentration of the activating solution is from 0 to 10 mol/L.

Preferably, the washing step is carried out by using dilute hydrochloric acid or nitric acid and the concentration of the washing solution is 0.5 mol/L to 2 mol/L.

Preferably, the drying temperature is 60 to 200° C.

Preferably, the inert atmosphere is nitrogen or argon;

Preferably, the fixed carbon content of the coal is 40 to 70%, the volatile content is 20 to 50%, the moisture content is 0 to 30%, the ash content 0 to 10%; coal element analysis requires carbon content of 50 to 80%, hydrogen content of 0 to 10%, oxygen content of 0 to 30%; the ash in the coal contains one or more of CaO, MgO, $K_2O$, $Na_2O$; the ash in the coal also contains one or more of $SiO_2$, $Al_2O_3$, $Fe_2O_3$, $TiO_2$, $MnO_2$, $P_2O_5$.

In another aspect, the present invention also discloses a graphene material prepared by the above-described method.

Effect of the Invention (1) The porous graphene prepared by this invention possesses multiple structural advantages such as a large number of monolayer of graphene sheet structure with <2 nm micropores, large surface area up to 3345 $m^2$/g, controllable pore structure. The control of graphene structure can be achieved by the introduction of the type of atmosphere, the ratio of the coal with the activation agent and the adjustment of the carbonization temperature.

(2) The porous graphene prepared by this invention possesses high carbon purity, low heteroatom content (<3-wt %), which makes it superior candidates as electrochemical energy storage materials and adsorbents with its significantly improved cycle life.

(3) The conventional coal-based activated carbon preparation process usually requires pre-carbonization to obtain a carbonaceous material with an initial pore structure, and then the carbonaceous material is mixed with the activation agent and subjected to a high temperature activation process to obtain an activated carbon material. The carbon source used in the invention is young lignite with low degree of metamorphism and strong plasticity of carbon skeleton. Therefore, the high surface area porous graphene material can be obtained only by one-step chemical activation method without pre-carbonization process, which greatly simplifies the preparation process and reduces the preparation cost.

(4) The coal-based raw material used in the invention is lignite, which is characterized by high content of internal ash (mainly alkali metal or alkaline earth metal compound) and high moisture content compared with other coal types. In the further activation process of forming porous graphene, the internal Mg, Ca and other metals play a catalytic role in the graphitization, and the moisture plays a certain role in the porosity-creating.

(5) Compared to activation process with pure inert atmosphere, the present invention provides a technical strategy for introducing $H_2$ in the activation process. The introduction of $H_2$ on the one hand can enhance the reduction decomposition of the carbon-based structure and accelerate the removal of the volatile components. On the other hand, the introduction of $H_2$ in the carrier gas facilitates further reduction of the oxygen containing groups on lignite surface and improves the purity of the carbon structure in the product.

(6) Compared with the existing graphene and porous graphene preparation methods, the invention uses low cost lignite as carbon source, and the preparation process is simple which is suitable for large-scale industrial production. The as-obtained porous graphene shows great application values in gas adsorption and electrochemical energy storage.

BRIEF DESCRIPTION OF THE DRAWINGS

FIG. 1(a) shows the Raman spectrum of the microporous graphene obtained in Example 1;

FIG. 1(b) shows the TEM image of the microporous graphene obtained in Example 1;

FIG. 2(a) shows the $N_2$ adsorption isotherm of the microporous graphene obtained in Examples 1, 2, 3;

FIG. 2(b) shows the pore size distribution curves of the microporous graphene obtained in Examples 1, 2, 3;

EXAMPLES

Figure 3:
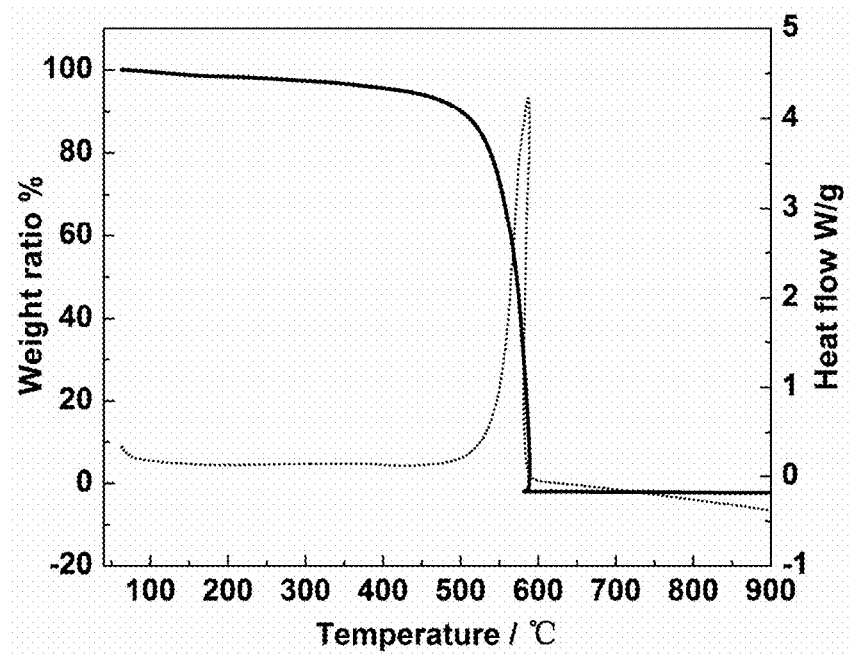
FIG. 3 shows the thermogravimetric curve of the porous graphene obtained in Example 1 in an air atmosphere.

The advantages of the present invention are further illustrated by the following specific examples, but the scope of the present invention is not limited to the following examples.

In the examples of the present invention, Zhundong coal containing the components shown in Table 1 and Table 2 below was selected.

TABLE 1

Proximate and ultimate analysis of Zhundong coal

| Sample | Proximate analysis/% | | | | Ultimate analysis/% | | | | |
| --- | --- | --- | --- | --- | --- | --- | --- | --- | --- |
| | $M_{ad}$ | $A_{ad}$ | $FC_{ad}$ | $V_{daf}$ | $C_{daf}$ | $H_{daf}$ | $O^*_{daf,diff}$ | $N_{daf}$ | $S_{daf}$ |
| Zhundong coal | 11.79 | 3.15 | 56.64 | 33.41 | 73.52 | 6.55 | 18.51 | 0.91 | 0.51 |

Note:
*Oxygen content is measured by the difference.

TABLE 2

Ash analysis of Zhundong coal

| Sample | Ash content analysis/% | | | | | | | | | | |
| --- | --- | --- | --- | --- | --- | --- | --- | --- | --- | --- | --- |
| | $SiO_2$ | $Al_2O_3$ | $Fe_2O_3$ | $TiO_2$ | CaO | MgO | $K_2O$ | $Na_2O$ | $MnO_2$ | $SO_3$ | $P_2O_5$ |
| Zhundong coal | 13.33 | 10.71 | 6.19 | 0.47 | 37.75 | 9.98 | 0.62 | 9.78 | 0.16 | 6.52 | 0.19 |

Example 1

The present embodiment is carried out according to the following steps:

(1) 3 g lignite coal powder with 80-100 mesh was added to 35.7 mL KOH solution with a concentration of 6 mol/L KOH (coal and KOH mass ratio of 1:4). The mixture solution was stirred at room temperature for 24 hours. Afterwards, the mixture of coal and KOH was dried at 120° C. to obtain a molten mixture.

(2) The above molten mixture was put in a tube furnace to carry out carbonization: from room temperature to 900° C., the controlled heating rate was 5° C./min, and carbonization residence time is 3 hours. Afterwards, the carbonized product was obtained by nature cooling.

(3) The carbonized product obtained in step (2) was successively washed with 2 mol/L dilute hydrochloric acid for 2 to 3 times and deionized water for 2 to 3 times, and finally dried at 80° C. to obtain the target product microporous graphene.

Example 2

3 g lignite coal powder with 100-200 mesh was added to 35.7 mL KOH solution with a concentration of 6 mol/L KOH (coal and KOH mass ratio of 1:4). The mixture solution was stirred at room temperature for 10 hours. Afterwards, the mixture of coal and KOH was dried at 60° C. to obtain a molten mixture. The above molten mixture was put in a tube furnace to carry out carbonization (from room temperature to 800° C. with a heating rate of 5° C./min and carbonization residence time of 4 hours). The carbonized product, obtained by nature cooling after the carbonization, was successively washed with 2 mol/L dilute hydrochloric acid for 2 to 3 times and deionized water for 2 to 3 times, and finally dried at 100° C. to obtain the porous graphene.

The structure and the property of the porous graphene obtained in the present example was characterized. Using the porous graphene obtained in the example 2 as the supercapacitor electrode in an organic system, the specific capacitance can achieve 140 F/g at a current density of 0.5 A/g.

Example 3

3 g lignite coal powder with 100-200 mesh was added to 35.7 mL KOH solution with a concentration of 6 mol/L KOH (coal and KOH mass ratio of 1:4). The mixture solution was stirred at room temperature for 15 hours. Afterwards, the mixture of coal and KOH was dried at 80° C. to obtain a molten mixture. The above molten mixture was put in a tube furnace to carry out carbonization (from room temperature to 700° C. with a heating rate of 8° C./min and carbonization residence time of 4 hours). The carbonized product, obtained by nature cooling after the carbonization, was successively washed with 2 mol/L dilute nitric acid for 2 to 3 times and deionized water for 2 to 3 times, and finally dried at 80° C. to obtain the porous graphene.

The structure and the property of the porous graphene obtained in the present example was characterized. Using the porous graphene obtained in the example 3 as the supercapacitor electrode in an organic system, the specific capacitance can achieve 100 F/g at a current density of 0.5 A/g.

Example 4

3 g lignite coal powder with 100-200 mesh was added to 26.8 mL KOH solution with a concentration of 6 mol/L KOH (coal and KOH mass ratio of 1:3). The mixture solution was stirred at room temperature for 36 hours. Afterwards, the mixture of coal and KOH was dried at 200° C. to obtain a molten mixture. The above molten mixture was put in a tube furnace to carry out carbonization (from room temperature to 900° C. with a heating rate of 2° C./min and carbonization residence time of 4 hours). The carbonized product, obtained by nature cooling after the carbonization, was successively washed with 2 mol/L dilute hydrochloric acid for 2 to 3 times and deionized water for 2 to 3 times, and finally dried at 80° C. to obtain the porous graphene.

The porous graphene obtained in the present example was characterized by the structural and properties characterization method of the porous graphene in example 1. The porous graphene obtained in example 4 possesses a BET surface area of 2219 $m^2/g$ and a pore volume of 1.86 $m^3/g$. Using the porous graphene obtained by the method in example 4 as the supercapacitor electrode in an organic system, the specific capacitance can achieve 130 F/g at a current density of 0.5 A/g.

Example 5

3 g lignite coal powder with 100-200 mesh was added to 17.8 mL KOH solution with a concentration of 6 mol/L KOH (coal and KOH mass ratio of 1:2). The mixture solution was stirred at room temperature for 8 hours. Afterwards, the mixture of coal and KOH was dried at 150° C. to obtain a molten mixture. The above molten mixture was put in a tube furnace to carry out carbonization (from room temperature to 900° C. with a heating rate of 2° C./min and carbonization residence time of 4 hours). The carbonized product, obtained by nature cooling after the carbonization, was successively washed with 2 mol/L dilute hydrochloric acid for 2 to 3 times and deionized water for 2 to 3 times, and finally dried at 80° C. to obtain the porous graphene.

The porous graphene obtained in the present example was characterized by the structural and properties characterization method of the porous graphene in example 1. The porous graphene obtained in example 5 possesses a BET surface area of 2009 $m^2/g$ and a pore volume of 1.47 $m^3/g$. Using the porous graphene obtained by the method in example 5 as the supercapacitor electrode in an organic system, the specific capacitance is 100 F/g at a current density of 0.5 A/g.

Example 6

3 g lignite coal powder with 80-200 mesh was added to 8.9 mL KOH solution with a concentration of 6 mol/L KOH (coal and KOH mass ratio of 1:1). The mixture solution was stirred at room temperature for 20 hours. Afterwards, the mixture of coal and KOH was dried at 150° C. to obtain a molten mixture. The above molten mixture was put in a tube furnace to carry out carbonization (from room temperature to 900° C. with a heating rate of 5° C./min and carbonization residence time of 4 hours). The carbonized product, obtained by natural cooling after the carbonization, was successively washed with 0.5 mol/L dilute hydrochloric acid for 2 to 3 times and deionized water for 2 to 3 times, and finally dried at 80° C. to obtain the porous graphene.

The porous graphene obtained in the present example was characterized by the structural and properties characterization method of the porous graphene in example 1. The porous graphene obtained in the present example possesses a BET surface area of 1885 $m^2/g$ and a pore volume of 1.43 m³/g. Using the porous graphene obtained by the method in example 6 as the supercapacitor electrode in an organic system, the specific capacitance is 90 F/g at a current density of 0.5 A/g.

Example 7

3 g lignite coal powder with 100-200 mesh was added to 71.4 mL KOH solution with a concentration of 3 mol/L KOH (coal and KOH mass ratio of 1:4). The mixture solution was stirred at room temperature for 10 hours. Afterwards, the mixture of coal and KOH was dried at 200° C. to obtain a molten mixture. The above molten mixture was put in a tube furnace to carry out carbonization (from room temperature to 600° C. with a heating rate of 1° C./min and carbonization residence time of 6 hours). The carbonized product, obtained by nature cooling after the carbonization, was successively washed with 2 mol/L dilute hydrochloric acid for 2 to 3 times and deionized water for 2 to 3 times, and finally dried at 100° C. to obtain the porous graphene.

The porous graphene obtained in the present example possesses a BET surface area of 2071 m²/g and a pore volume of 1.47 m³/g.

Example 8

3 g lignite coal powder with 80-100 mesh was added to 50 mL NaOH solution with a concentration of 6 mol/L NaOH (coal and NaOH mass ratio of 1:4). The mixture solution was stirred at room temperature for 15 hours. Afterwards, the mixture of coal and KOH was dried at 120° C. to obtain a molten mixture. The above molten mixture was put in a tube furnace to carry out carbonization (from room temperature to 1000° C. with a heating rate of 5° C./min and carbonization residence time of 4 hours). The carbonized product, obtained by natural cooling after the carbonization, was successively washed with 2 mol/L dilute hydrochloric acid for 2 to 3 times and deionized water for 2 to 3 times, and finally dried at 80° C. to obtain the porous graphene.

The porous graphene obtained in the present example possesses a BET surface area of 2081 m²/g and a pore volume of 1.57 m³/g.

Example 9

3 g lignite coal powder with 100-200 mesh was added to 25 mL NaOH solution with a concentration of 6 mol/L NaOH (coal and NaOH mass ratio of 1:2). The mixture solution was stirred at room temperature for 24 hours. Afterwards, the mixture of coal and KOH was dried at 120° C. to obtain a molten mixture. The above molten mixture was put in a tube furnace to carry out carbonization (from room temperature to 600° C. with a heating rate of 10° C./min and carbonization residence time of 6 hours). The carbonized product, obtained by natural cooling after the carbonization, was successively washed with 2 mol/L dilute nitric acid for 2 to 3 times and deionized water for 2 to 3 times, and finally dried at 100° C. to obtain the porous graphene.

The porous graphene obtained in the present example possesses a BET surface area of 1061 m2/g and a pore volume of 0.67 m³/g.

Example 10

3 g lignite coal powder with 80-100 mesh was added to 12 mL NaOH solution with a concentration of 6 mol/L NaOH (coal and NaOH mass ratio of 1:1). The mixture solution was stirred at room temperature for 24 hours. Afterwards, the mixture of coal and KOH was dried at 120° C. to obtain a molten mixture. The above molten mixture was put in a tube furnace to carry out carbonization (from room temperature to 1100° C. with a heating rate of 8° C./min and carbonization residence time of 2 hours). The carbonized product, obtained by natural cooling after the carbonization, was successively washed with 0.5 mol/L dilute hydrochloric acid for 2 to 3 times and deionized water for 2 to 3 times, and finally dried at 80° C. to obtain the porous graphene.

The porous graphene obtained in the present example possesses a BET surface area of 756 m²/g and a pore volume of 0.24 m³/g.

Example 11

3 g lignite coal powder with 60-100 mesh was added to a mixture solution containing 12 mL NaOH solution with a concentration of 6 mol/L and 8.6 mL KOH solution with a concentration of 6 mol/L (coal and KOH+NaOH mass ratio of 1:2). The mixture solution was stirred at room temperature for 20 hours. Afterwards, the mixture of coal, NaOH and KOH was dried at 150° C. to obtain a molten mixture. The above molten mixture was put in a tube furnace to carry out carbonization (from room temperature to 900° C. with a heating rate of 8° C./min and carbonization residence time of 5 hours). The carbonized product, obtained by natural cooling after the carbonization, was successively washed with 2 mol/L dilute hydrochloric acid for 2 to 3 times and deionized water for 2 to 3 times, and finally dried at 60° C. to obtain the porous graphene.

The porous graphene obtained in the present example possesses a BET surface area of 1021 m2/g and a pore volume of 0.48 m³/g.

Example 12

The introduction of $H_2$ in the carrier gas of the carbonation process is expected to increase the amount of potassium generation in the activation process to enhance the pore formation. In addition, the reaction of $H_2$ with the surface heteroatom can improve the purity of the porous graphene. In this embodiment, $H_2$ was introduced into the carbonization atmosphere. Specifically, 3 g lignite coal powder with 100-200 mesh was added to 35.7 mL KOH solution with a concentration of 6 mol/L KOH (coal and KOH mass ratio of 1:4). The mixture solution was stirred at room temperature for 24 hours. Afterwards, the mixture of coal and KOH was dried at 200° C. to obtain a molten mixture. The above molten mixture was put in a tube furnace to carry out carbonization (from room temperature to 800° C. with a heating rate of 5° C./min and carbonization residence time of 6 hours). The carbonization atmosphere consists of 5% $H_2$ and 95% argon (volume fraction). The carbonized product, obtained by nature cooling after the carbonization, was successively washed with 2 mol/L dilute hydrochloric acid for 2 to 3 times and deionized water for 2 to 3 times, and finally dried at 100° C. to obtain the porous graphene.

The porous graphene obtained in the present example possesses a BET surface area of 2003 m²/g and a pore volume of 0.97 m³/g.

Example 13

3 g lignite coal powder with 80-200 mesh was added to 50 mL NaOH solution with a concentration of 6 mol/L NaOH (coal and NaOH mass ratio of 1:4). The mixture solution was stirred at room temperature for 24 hours. Afterwards, the mixture of coal and KOH was dried at 100° C. to obtain a molten mixture. The above molten mixture was put in a tube furnace to carry out carbonization (from room temperature to 900° C. with a heating rate of 8° C./min and carbonization residence time of 4 hours). The carbonization atmosphere consists of 50% $H_2$ and 50% argon (volume fraction). The carbonized product, obtained by natural cooling after the carbonization, was successively washed with 2 mol/L dilute nitric acid for 2 to 3 times and deionized water for 2 to 3 times, and finally dried at 100° C. to obtain the porous graphene.

The porous graphene obtained in the present example possesses a BET surface area of 1941 $m^2$/g and a pore volume of 1.01 $m^3$/g.

Example 14

The introduction of $NH_3$ in the carrier gas of the carbonation process is expected to dope nitrogen atom into the carbon structure of resulting porous graphene. 3 g lignite coal powder with 80-200 mesh was added to a mixture solution containing 8.6 mL KOH solution with a concentration of 6 mol/L and 12 mL NaOH solution with a concentration of 6 mol/L (coal and KOH+NaOH mass ratio of 1:2). The mixture solution was stirred at room temperature for 15 hours. Afterwards, the mixture was dried at 120° C. to obtain a molten mixture. The above molten mixture was put in a tube furnace to carry out carbonization (from room temperature to 900° C. with a heating rate of 8° C./min and carbonization residence time of 4 hours). The carbonization atmosphere consists of 50% $NH_3$ and 50% argon (volume fraction). The carbonized product, obtained by natural cooling after the carbonization, was successively washed with 2 mol/L dilute hydrochloric acid for 2 to 3 times and deionized water for 2 to 3 times, and finally dried at 100° C. to obtain the porous graphene.

The porous graphene obtained in the present example possesses a BET surface area of 1051 $m^2$/g and a pore volume of 0.45 $m^3$/g.

Example 15

3 g lignite coal powder with 80-200 mesh was added to a mixture solution containing 17.2 mL KOH solution with a concentration of 6 mol/L and 24 mL NaOH solution with a concentration of 6 mol/L (coal and KOH+NaOH mass ratio of 1:4). The mixture solution was stirred at room temperature for 20 hours. Afterwards, the mixture was dried at 200° C. to obtain a molten mixture. The above molten mixture was put in a tube furnace to carry out carbonization (from room temperature to 1200° C. with a heating rate of 8° C./min and carbonization residence time of 4 hours). The carbonization atmosphere consists of 10% $NH_3$ and 90% argon (volume fraction). The carbonized product, obtained by natural cooling after the carbonization, was successively washed with 2 mol/L dilute hydrochloric acid for 2 to 3 times and deionized water for 2 to 3 times, and finally dried at 80° C. to obtain the porous graphene.

The porous graphene obtained in the present example possesses a BET surface area of 1081 $m^2$/g and a pore volume of 0.64 $m^3$/g.

Example 16

3 g lignite coal powder with 60-100 mesh was added to a mixture solution containing 43 mL KOH solution with a concentration of 6 mol/L and 60 mL NaOH solution with a concentration of 6 mol/L (coal and KOH+NaOH mass ratio of 1:10). The mixture solution was stirred at room temperature for 20 hours. Afterwards, the mixture was dried at 150° C. to obtain a molten mixture. The above molten mixture was put in a tube furnace to carry out carbonization (from room temperature to 900° C. with a heating rate of 0.1° C./min and carbonization residence time of 1 hours). The carbonized product, obtained by natural cooling after the carbonization, was successively washed with 2 mol/L dilute hydrochloric acid for 2 to 3 times and deionized water for 2 to 3 times, and finally dried at 50° C. to obtain the porous graphene.

The porous graphene obtained in the present example possesses a BET surface area of 1061 $m^2$/g and a pore volume of 0.49 $m^3$/g.

Example 17

3 g lignite coal powder with 80-100 mesh was added to a mixture solution containing 430 μL KOH solution with a concentration of 6 mol/L and 600 μL NaOH solution with a concentration of 6 mol/L (coal and KOH+NaOH mass ratio of 1:0.1). The mixture solution was stirred at room temperature for 20 hours. Afterwards, the mixture was dried at 150° C. to obtain a molten mixture. The above molten mixture was put in a tube furnace to carry out carbonization (from room temperature to 1000° C. with a heating rate of 15° C./min and carbonization residence time of 10 hours). The carbonized product, obtained by natural cooling after the carbonization, was successively washed with 2 mol/L dilute hydrochloric acid for 2 to 3 times and deionized water for 2 to 3 times, and finally dried at 200° C. to obtain the porous graphene.

The porous graphene obtained in the present example possesses a BET surface area of 92 $m^2$/g and a pore volume of 0.05 $m^3$/g.

Example Effects

Raman, TEM, $N_2$ adsorption, XPS and XRD were used to characterize the graphitization degree, microstructure and pore structural parameters of the porous graphene materials obtained by the above examples. The detailed analysis is as follows:

FIGS. 1(a) and 1(b) show the Raman spectrum and the transmission electron microscope (TEM) image of the microporous graphene obtained in Example 1, respectively. The apparent 2D peak in the Raman spectrum shows that the microporous graphene synthesized in Example 1 contains a large number of monolayer or multilayer graphene structural units. TEM image shows that the microporous graphene is mainly composed of a large number of monolayer of graphene sheet structure, these randomly arranged graphene layer structure contains a large number of small pores with pore size around 2 nm.

FIGS. 2(a) and 2(b) show the $N_2$ adsorption isotherms and corresponding pore size distributions of the microporous graphene obtained in Examples 1, 2 and 3 from which the microporous graphene obtained by Example 1 has a specific surface area of 3345 $m^2$/g and a pore volume of 1.7 $cm^3$/g. The distribution of the pore size is narrow, mainly between 1~2 nm.

FIG. 3 is a thermogravimetric curve of the porous graphene obtained in Example 1 in an air atmosphere. It can be seen that the weight loss peak is concentrated between 500 and 600° C., which is higher than that of the conventional activated carbon. This indicates that the porous graphene obtained in Example 1 has a high carbon purity enhancing the structural stability.

Figure 4:
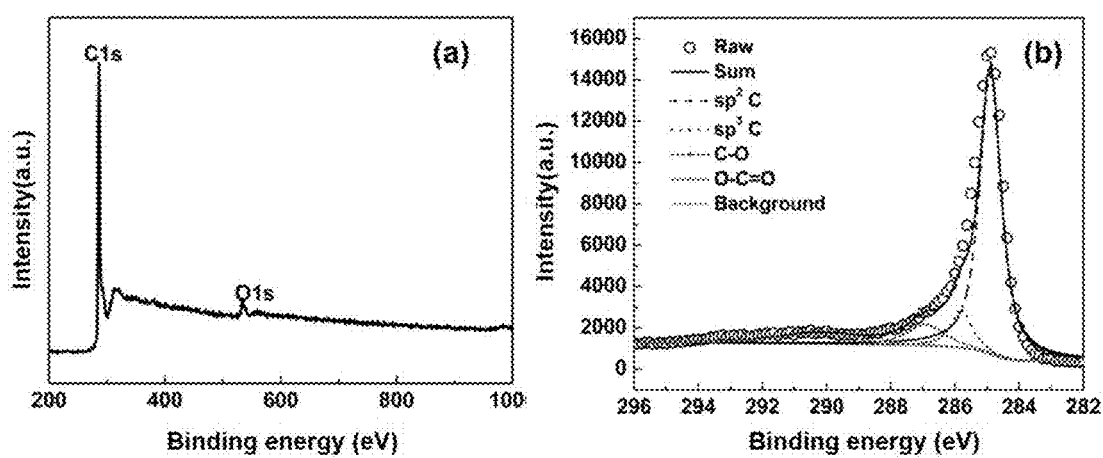
FIG. 4(a) shows the X-ray photoelectron spectroscopy (XPS) chart of the porous graphene obtained in Example 1.
FIG. 4(b) shows the X-ray photoelectron spectroscopy (XPS) spectrum of the porous graphene obtained in Example 1.

FIGS. 4(a) and (b) show the X-ray photoelectron spectroscopy (XPS) results of the porous graphene obtained in Example 1, and it can be seen that the carbon content of the obtained porous graphene is relatively high and the oxygen signal is relatively weak. The C1s peak in FIG. 4(b) shows that sp2 carbon is dominant with low proportion of oxygen-containing functional groups. Further XPS element analysis results show that the carbon content in the porous graphene obtained in Example 1 is as high as 98.25%, which directly proves the high carbon purity.

Figure 5:
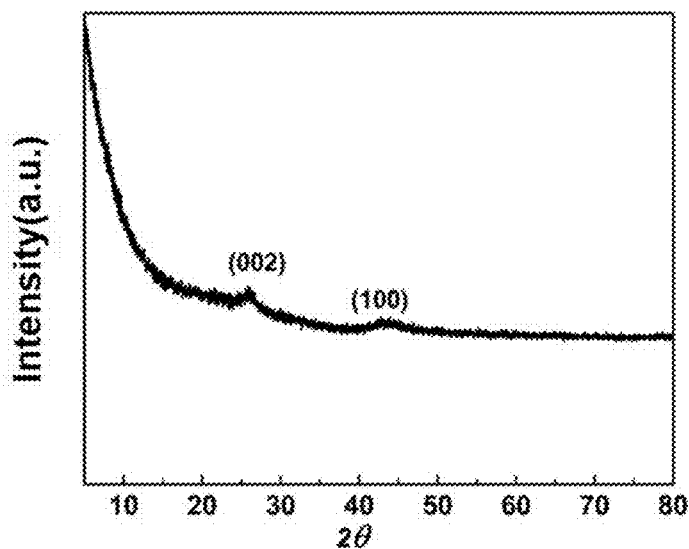
FIG. 5 shows the X-ray diffraction pattern (XRD) of the porous graphene obtained in Example 1.

FIG. 5 shows the X-ray diffraction pattern (XRD) of the porous graphene obtained in Example 1 from which the high diffraction within small angles indicates a highly porous structure. The obvious (002) peak proves the presence of the graphene structure.

The as-prepared porous graphene obtained in examples was tested as supercapacitor electrode materials in the aqueous system. The performance was evaluated by the following test: the porous graphene, carbon black and poly-tetrafluoroethylene (PTFE) binder were added into the absolute ethyl alcohol with the mass ratio of 8:1:1 to form self-supporting foils. Two thin foils with the same mass (around 1~2 mg) were tailored and rolled into a foil electrode with the area of 1 cm$^2$ in the mortar which were then pressed onto nickel foam to form the electrodes for the capacitive performance test. The electrodes were dried at 120° C. for 12 h under vacuum for further treatment. The cyclic voltammetric curves and the galvanostatic charge-discharge curves for a three-electrode system were measured by using the electrolytes of 6M KOH and 1M H$_2$SO$_4$, the reference electrodes of a saturated calomel electrode (SCE) and a Ag/AgCl electrode, and the counter electrode of Pt foil. Wherein, specific capacitance (C, F g$^{-1}$) of the porous graphene materials were calculated based on the formula: $C=I\Delta t/(m\Delta V)$, in which I is the discharge current density, $\Delta t$ is time for a full discharge, m is the active material mass of the porous graphene contained in the cathode foil and $\Delta V$ represents voltage window (excluding the voltage drop $IR_{drop}$).

Figure 6:
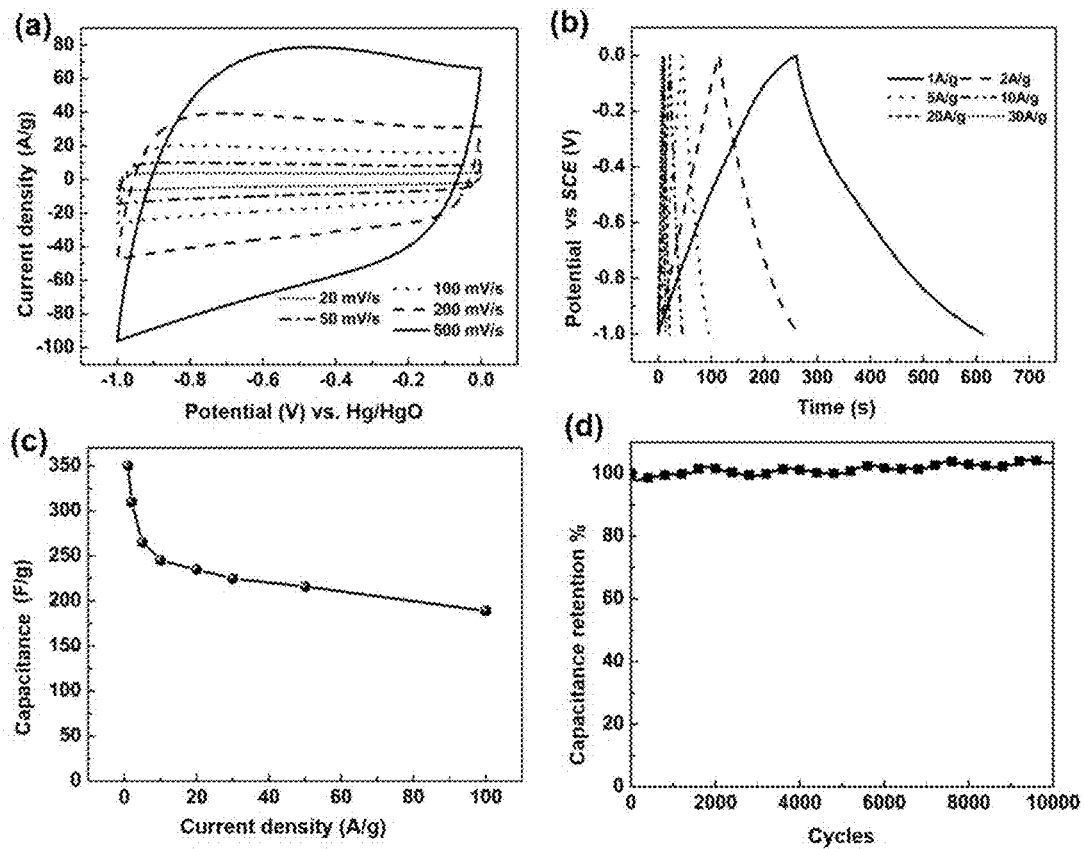
FIG. 6(a) shows the cyclic voltammetric curves of the porous graphene obtained in Example 1 in a 6 M KOH electrolyte system.
FIG. 6(b) shows the charge-discharge characteristic curves of the porous graphene obtained in Example 1 in a 6M KOH electrolyte system.
FIG. 6(c) shows the current density-specific capacitance curve of the porous graphene obtained in Example 1 in a 6 M KOH electrolyte system.
FIG. 6(d) shows the cycle stability curve of the porous graphene at 5 A/g obtained in Example 1 in a 6 M KOH electrolyte system.

FIG. 6 shows the results of the supercapacitor performance of the porous graphene obtained in Example 1 in a 6 M KOH electrolyte system. The porous graphene obtained Example 1 has high specific capacitances, excellent rate performance and cyclic stability in 6M KOH system. The cyclic voltammetric curves in FIG. 6(a) show that the rectangular capacitance behavior is maintained at a high sweep speed of 500 mV/s. The capacitance at 1 A/g is 350 F/g. Even at a high current density of 100 A/g, the capacitance can still maintain 200 F/g. FIG. 6(d) presents the cycle stability of porous graphene obtained in Examples 1 at 5 A/g, which demonstrates no capacitance decay even after 10,000 cycles.

Figure 7:
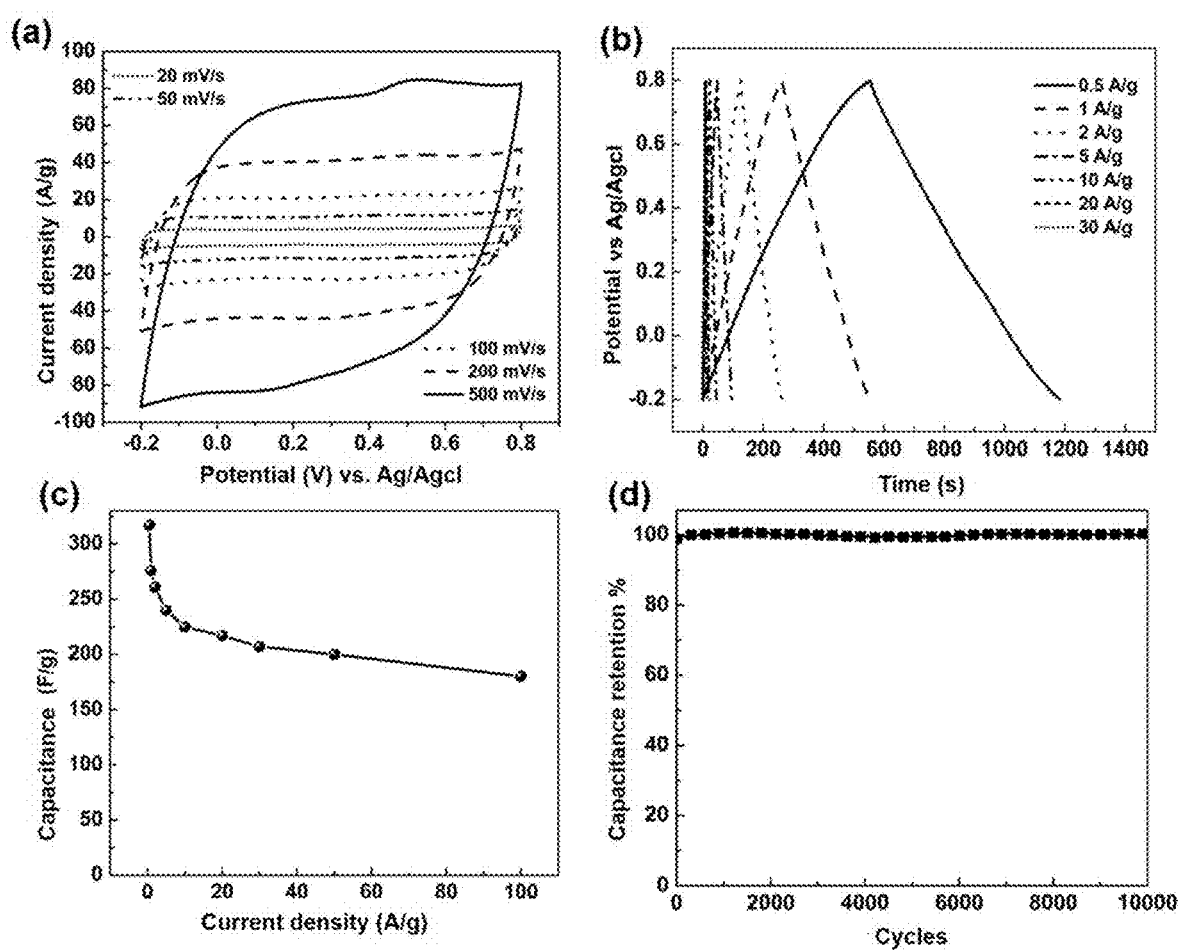
FIG. 7(a) shows the cyclic voltammetric curves of the porous graphene obtained in Example 1 in a 1 M $H_2SO_4$ electrolyte system.
FIG. 7(b) shows the charge-discharge characteristic curves of the porous graphene obtained in Example 1 in a 1 M $H_2SO_4$ electrolyte system.
FIG. 7(c) shows the current density-specific capacitance curve of the porous graphene obtained in Example 1 in a 1 M $H_2SO_4$ electrolyte system.
FIG. 7(d) shows the cycle stability curve of the porous graphene at 5 A/g obtained in Example 1 in a 1 M $H_2SO_4$ electrolyte system.

FIG. 7 shows the results of the supercapacitor performance of the porous graphene obtained in Example 1 in a 1 M H$_2$SO$_4$ electrolyte system. Similarly, the porous graphene obtained Example 1 has high specific capacitances, excellent rate performance and cyclic stability in 1 M H$_2$SO$_4$ system. The cyclic voltammetric curves in FIG. 7(a) show that the rectangular capacitance behavior is maintained at a high sweep speed of 500 mV/s. The capacitance at 0.5 A/g is 350 F/g. Even at a high current density of 100 A/g, the capacitance can still maintain 200 F/g. FIG. 7(d) presents the cycle stability of porous graphene obtained in Examples 1 at 5 A/g, which demonstrates no capacitance decay even after 10,000 cycles.

The as-prepared porous graphene obtained in examples was tested as double-layer supercapacitor electrode materials in the organic system. The performance was evaluated by the following test: the porous graphene, carbon black and poly-tetrafluoroethylene (PTFE) binder were added into the absolute ethyl alcohol with the mass ratio of 8:1:1 to form self-supporting foils. Two thin foils with the same mass (around 1~2 mg) were tailored and rolled into foil electrodes with the area of 1 cm$^2$ in the mortar which were then pressed onto the conductive carbon coated aluminum foils to form the electrodes for the capacitive performance test. The electrodes were dried at 120° C. for 12 h under vacuum for further treatment. Thereby, the two identical electrodes were assembled in a coin cell with the electrolyte of 1 mol/L ET$_4$NBF$_4$/PC and the separator of Celgard® 3510 ionic porous membrane, in order to measure the galvanostatic charge-discharge performance of the supercapacitor in organic system. The specific capacitance of the porous graphene material was calculated based on the formula: $C=2 I\Delta t/(m\Delta V)$, in which I is the discharge current density, $\Delta t$ is the time for a full discharge, m is the active material mass of one electrode and $\Delta V$ represents voltage window (excluding the voltage drop $IR_{drop}$).

Figure 8:
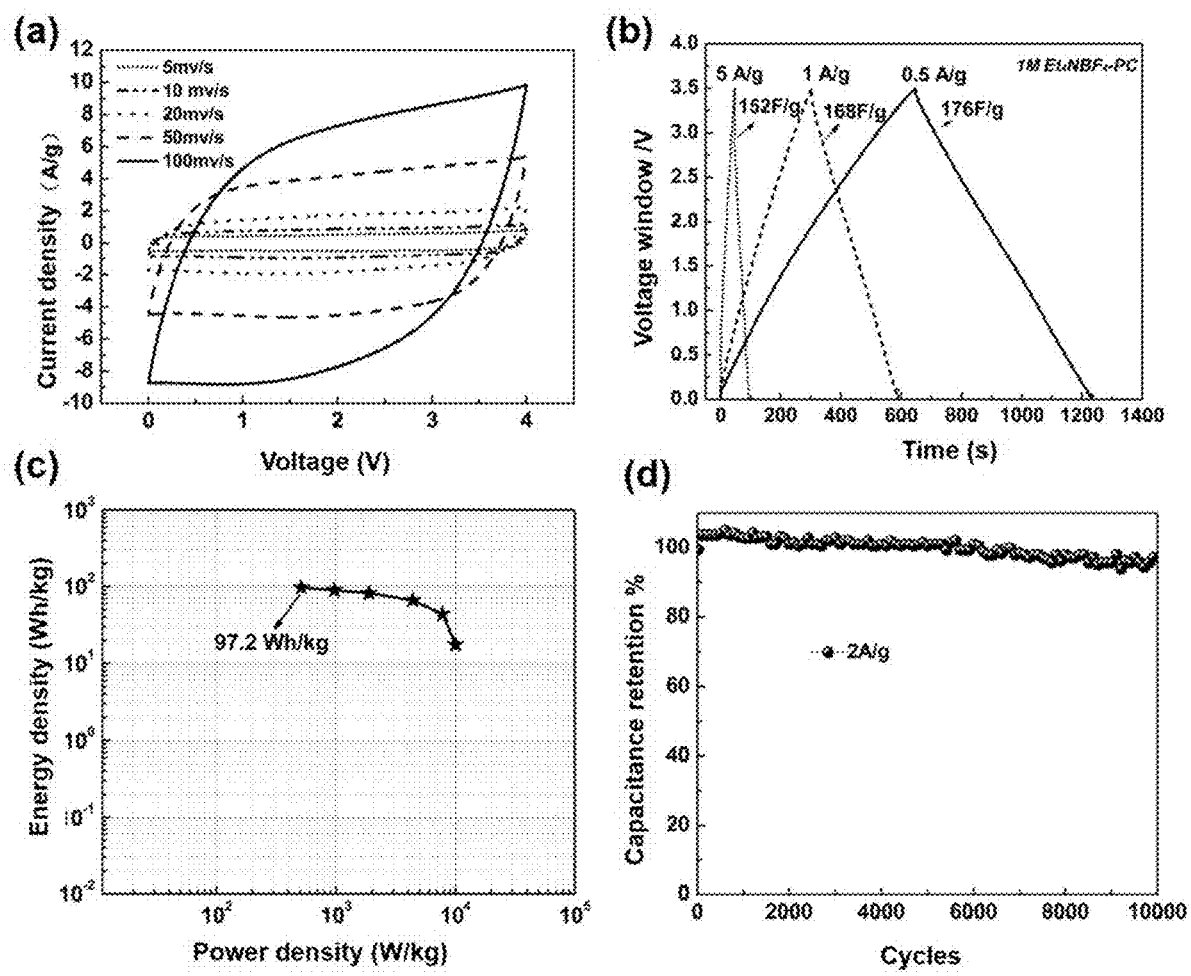
FIG. 8(a) shows the cyclic voltammetric curves of the porous graphene obtained in Example 1 in a commercial 1 M $ET_4NBF_4$/PC electrolyte system.
FIG. 8(b) shows the charge-discharge characteristic curves of the porous graphene obtained in Example 1 in a commercial 1 M $ET_4NBF_4$/PC electrolyte system.
FIG. 8(c) shows the Ragone curve of the porous graphene obtained in Example 1 in a commercial 1 M $ET_4NBF_4$/PC electrolyte system.
FIG. 8(d) shows the cycle stability curve of the porous graphene at 2 A/g obtained in Example 1 in a commercial 1 M $ET_4NBF_4$/PC electrolyte system.

Wherein, FIG. 8 shows the results of the supercapacitor performance of the porous graphene obtained in Example 1 in a 1 mol/L ET$_4$NBF$_4$/PC electrolyte system. FIG. 8(a) shows that the voltage window of the porous graphene obtained in the invention can achieve 4 V with no obvious polarization in the 1 mol/L ET4NBF4/PC system. The specific capacitance of the porous graphene obtained in Example 1 could reach 176 F/g at the operating voltage of 3.5 V with the current density of 0.5 A/g. After cycling 10000 cycles at the current density of 2 A/g, it can still maintain the capacitance retention of 96%. The highest energy density of the constructed supercapacitor could reach 97.2Wh/kg, which is much higher than that of the commercial activated carbon based supercapacitors.

Figure 9:
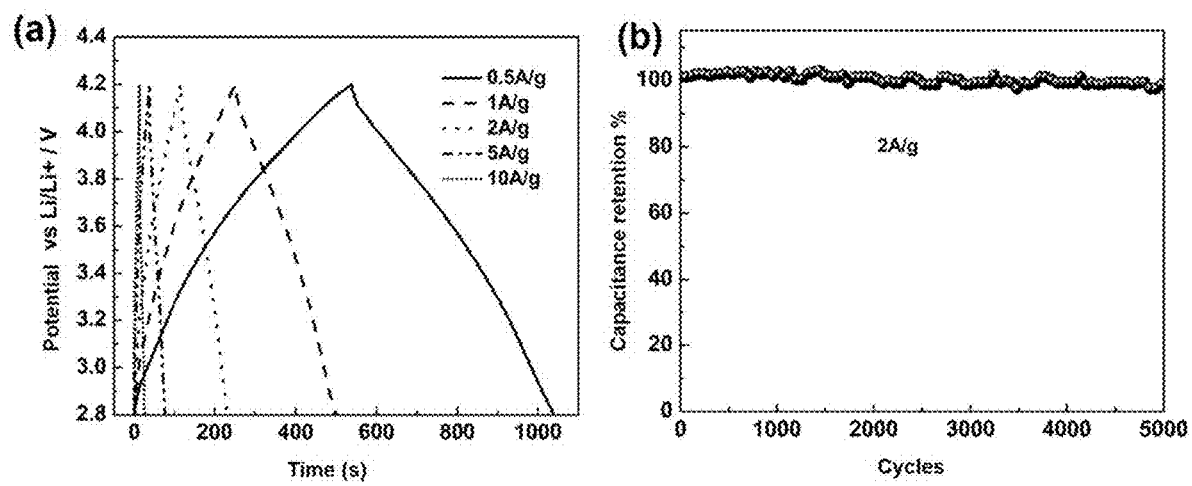
FIG. 9(a) shows the cyclic voltammetric curve of the porous graphene obtained in Example 1 as a cathode material for a lithium ion supercapacitor.
FIG. 9(b) shows the cycle stability curve of the porous graphene at 2 A/g obtained in Example 1 as a cathode material for a lithium ion supercapacitor.

The performance of the lithium ion supercapacitors was evaluated by using the porous graphene obtained in examples as cathode material of the lithium ion supercapacitors and the half-cell constructed by the anode of lithium metal foil. Specifically, the experiment was conducted as follows: the porous graphene materials, carbon black and PTFE binder (mass content of 70%) were added into the absolute ethyl alcohol with the mass ratio of 8:1:1 to form self-supporting foils. The thin foils with the mass around 1 mg were tailored and rolled into the electrodes with the area of 1 cm$^2$ in the mortar which were then pressed onto the conductive carbon coated aluminum foils to form the electrodes for the performance test of the cathode material. The electrodes were dried at 120° C. for 12 h under vacuum for further treatment. The coin cell is assembled with the electrolyte of 1 mol/L LiPF$_6$ (with the solvent of EC-DMC at a ratio of 1:1), the separator of Whatman glass fiber membrane and the anode of lithium metal foil, in order to measure its cyclic voltammetric curves and the constant capacitance and galvanostatic charge-discharge characteristic curves. Wherein, the specific capacitances of the porous graphene material was calculated based on the formula: $C=I\Delta t/(m\Delta V)$, in which I is the discharge current density, $\Delta t$ is the time for a full discharge, m is the active material mass of the porous graphene contained in the cathode foil and $\Delta V$ represents the voltage window (excluding the voltage drop $IR_{drop}$). Wherein, FIG. 9 shows the electrochemical performances of the porous graphene in Example 1, which contains a galvanostatic charge-discharge curve operated at a voltage window of 2.8 to 4.2 V (vs Li/Li$^+$) with different current densities and cycling stability curve at a current density of 2 A/g. The charge-discharge curve and rate performance show that the porous graphene in Example 1 exhibits a capacitance of 182 F/g at 0.5 A/g. After 5000 cycles at 2 A/g, the porous graphene in Example 1 can still exhibit a high capacitance retention of 95%.

Figure 10:
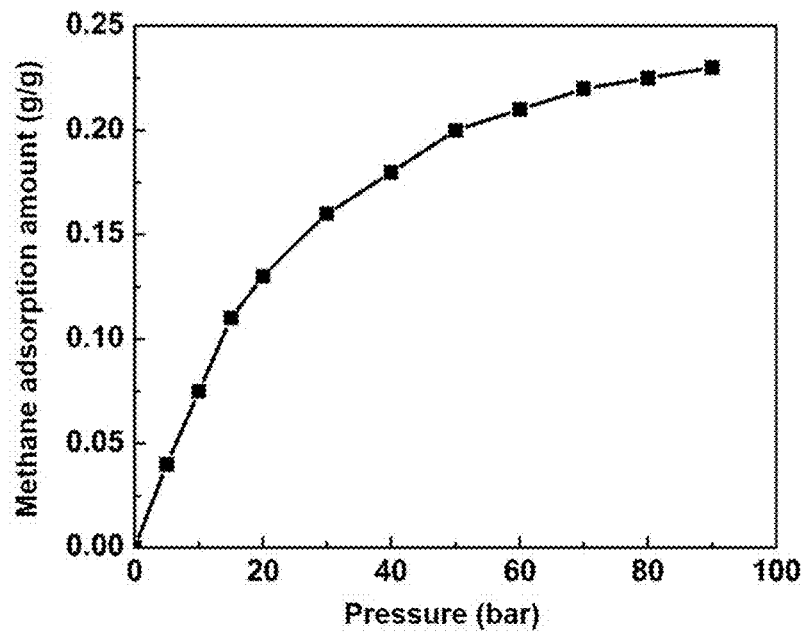
FIG. 10 shows the methane adsorption isotherm of the porous graphene obtained in Example 1.

The porous graphene obtained in examples was also evaluated as adsorbent for methane storage. The adsorption isotherm of methane was measured by weight adsorption method. As shown in FIG. 10, the porous graphene prepared in Example 1 exhibits excellent methane storage properties with >20% weight storage ratio at a pressure of 90 bar.

The as-prepared N-doped porous graphene obtained in Example 14 was tested as anode materials for lithium ion batteries. The performance test method is: the counter electrode of lithium metal foil and the working electrode active materials of the porous graphene were assembled in the CR2032 coin cell to evaluate its performance as the anode materials for lithium ion batteries. Wherein, the preparation method of the working electrode is: N-doped porous graphene, carbon black and polyvinylidene fluoride (PVDF) binder with a mass ratio of 7:1.5:1.5 were dissolved in N-methyl-2-pyrroli-dinone (NMP) and milled to form uniform slurries. After coating the above slurries on Cu foils, the working electrode foils were obtained after being dried at 80° C. under vacuum for 12 h. The dried electrode foils were tailored into circular foils with 0.5~1 mg cm$^{-2}$ mass loading of active material. Then, the circular foils and the fresh lithium foil were assembled in the coin cell. The assembly of the coin cells was done in a glove box. The electrolyte used in the coin cells was 1M LiPF$_6$ in ethylene carbonate and dimethyl carbonate (EC: DEC=1:1) and Whatman glass fiber was used as separator. The cyclic voltammetric curves and galvanostatic charge-discharge curves of the batteries were measured with the voltage window of 0.01~3 V versus Li/Li$^+$.

Figure 11:
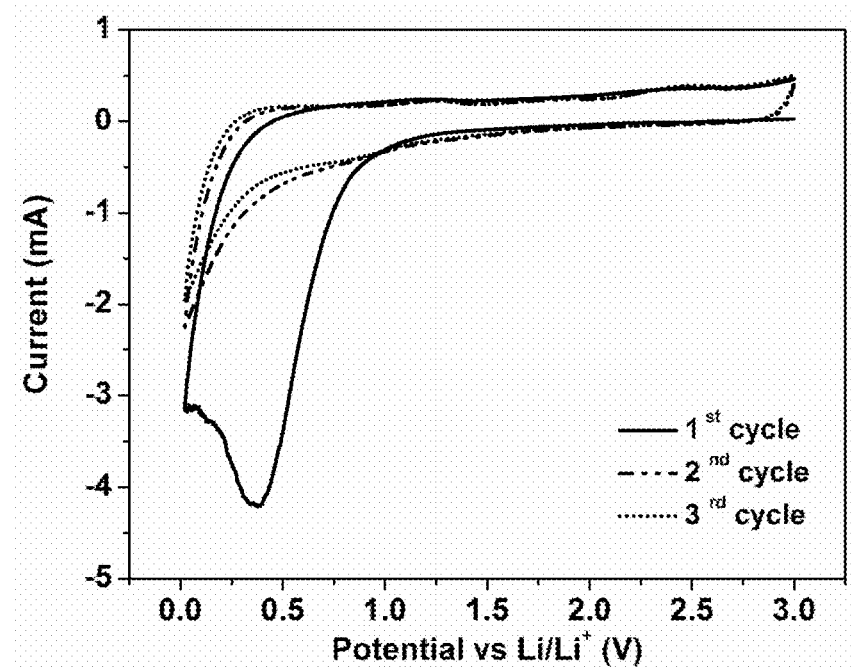
FIG. 11 shows the cyclic voltammetric curve of a lithium ion battery anode constructed by the nitrogen-doped porous graphene obtained in Example 14 at a speed of 0.2 mV/s.

Wherein, FIG. 11 shows the cyclic voltammetric curve at a speed of 0.2 mV/s of the anode constructed by N-doped porous graphene obtained in Example 14, which embodies the characteristics of a typical carbon material. The first discharge capacity is large and becomes stable and reversible after two cycles because of the formation of SEI layer.

Figure 12:
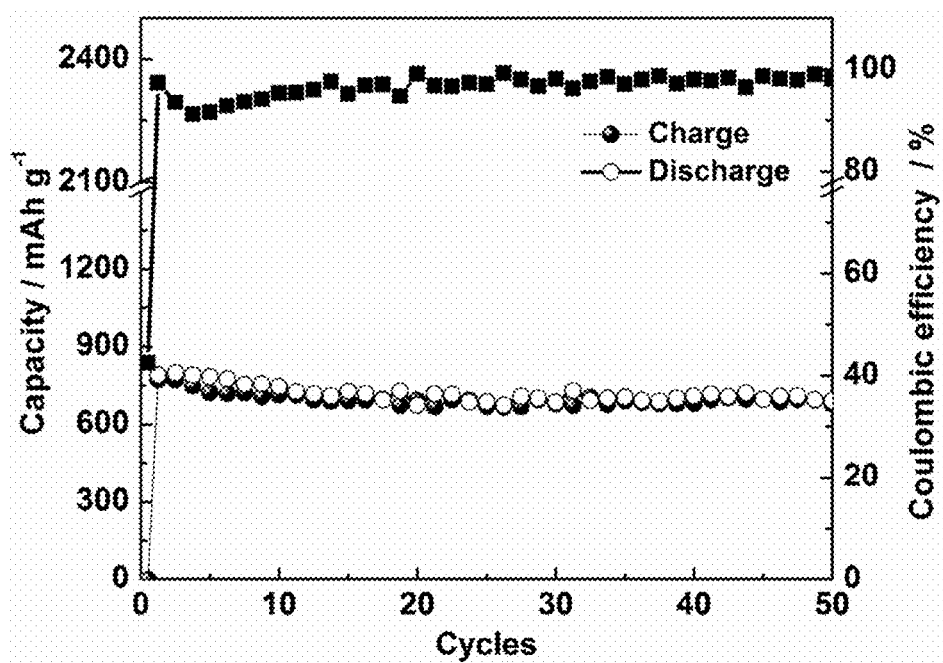
FIG. 12 shows the charge-discharge characteristic curves of a lithium ion battery anode constructed by the nitrogen-doped porous graphene obtained in Example 14 at a current density of 0.2 A/g.

Wherein, FIG. 12 shows galvanostatic charge-discharge curves at a current density of 0.2 A/g of the anode constructed by N-doped porous graphene obtained in Example 14, which is in agreement with the cyclic voltammetric curve in FIG. 11 The initial discharge capacity is up to 1814 mAh/g. After 50 cycles, the specific capacity remains at 690 mAh/g, about 2 times the commercial graphite material.

Figure 13:
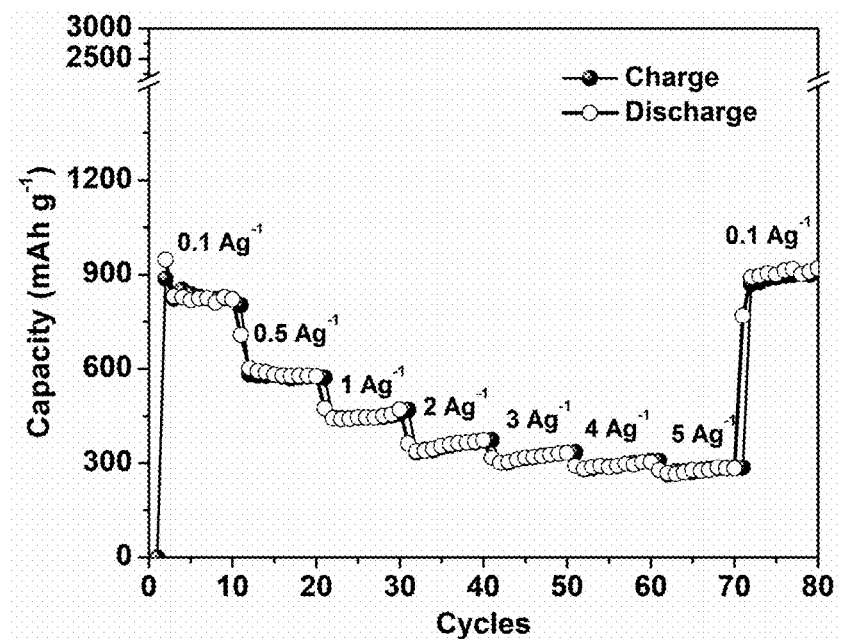
FIG. 13 shows the rate performance of a lithium ion battery anode constructed by the nitrogen-doped porous graphene obtained in Example 14.

Wherein, FIG. 13 shows rate performance curves of the N-doped porous graphene obtained in Example 14, from which the N-doped porous graphene obtained in Example 14 exhibits a high capacity of 830 mAh/g at 0.1 A/g and still 293 mAh/g at 5 A/g, demonstrating the excellent rate capability.

Table 3 shows the results of the analysis of pore structure parameters and X-ray photoelectron spectroscopy (XPS) elements of the porous graphene materials obtained in Examples 1 to 17. It can be seen that the pore structure and surface chemistry environment of as-prepared porous graphene materials can be adjusted by changing the synthesis conditions such as carbonization temperature, carbonization time, stirring time, heating rate, precursor ratio and carbonization atmosphere.

TABLE 3

Pore parameters obtained by N$_2$ adsorption and XPS element contents

| Porous graphene | BET surface area ($m^2g^{-1}$) | Pore Volume ($cm^3g^{-1}$) | XPS element content (at.-%) | | |
|---|---|---|---|---|---|
| | | | C | O | N |
| Example 1 | 3445 | 1.7 | 98.25 | 1.75 | — |
| Example 2 | 2061 | 1.07 | 97.45 | 2.55 | — |
| Example 3 | 1334 | 0.74 | 96.75 | 3.25 | — |
| Example 4 | 2219 | 1.86 | 98.15 | 1.85 | — |
| Example 5 | 2009 | 1.47 | 96.37 | 3.63 | — |
| Example 6 | 1885 | 1.43 | 97.28 | 2.72 | — |
| Example 7 | 2071 | 1.47 | 96.94 | 3.06 | — |
| Example 8 | 2081 | 1.57 | 97.43 | 2.57 | — |
| Example 9 | 1061 | 0.67 | 98.02 | 1.98 | — |
| Example 10 | 756 | 0.24 | 98.45 | 1.55 | — |
| Example 11 | 1021 | 0.48 | 96.78 | 3.22 | — |
| Example 12 | 2003 | 0.97 | 97.88 | 2.12 | — |
| Example 13 | 1941 | 1.01 | 97.3 | 2.7 | — |
| Example 14 | 1051 | 0.45 | 90.98 | 3.09 | 5.93 |
| Example 15 | 1081 | 0.64 | 93.55 | 4.11 | 2.34 |
| Example 16 | 1061 | 0.49 | 96.3 | 3.7 | — |
| Example 17 | 92 | 0.05 | 95.2 | 4.8 | — |

It can be seen from above results that porous graphene materials can be obtained by the present invention through the following three steps: mixing and drying the mixture of coal powder and activation agent; high-temperature activation; washing and final drying. Therein, high temperature activation process remodels the internal small molecule hydrocarbons and amorphous structure of lignite during which the Mg and Ca compositions in lignite catalyze the graphitization conversion of graphite-like microcrystals to monolayer or multilayer graphene structure. At the same time, microporous structure generates under the activation etching of graphene sheet structure by activation agents. Finally, the porous graphene can be obtained by cleaning the residual activation agents and minerals. It is obvious that the factors influencing the pyrolysis, remodeling and pore formation of the lignite structure during the high temperature activation will profoundly affect the morphology, pore structure and carbon purity of the final target product.

It should be understood that the foregoing description of some embodiments is merely illustrative of the ways and cores of the present invention. It should be noted that it will be apparent to those skilled that various modifications and adaptations may be made to the present invention without departing from the principles of the invention. These modifications are also within the scope of the claims of the present invention.

The invention claimed is:

1. A method for preparing graphene from coal as raw material, the method comprising:
   refining step: refining the coal block or coal particle to get fine powdered coal;
   activation step: immersing the fine powdered coal obtained by the refining step with activation agent solution with stirring for 10-36 h at room temperature and drying water to get a molten mixture of the powered coal and the activation agent solution;
   carbonization step: carbonizing the molten mixture obtained in the activation step in an inert gas or a mixture of hydrogen and inert atmosphere and naturally cooling to obtain a carbonized product; and washing and drying step: successively acid washing, water-washing and drying the carbonized product to obtain porous graphene.

2. The method for preparing graphene according to claim 1, wherein the activation agent solution is an alkali metal hydroxide, alkaline earth metal hydroxides or mixtures thereof.

3. The method for preparing graphene according to claim 1, wherein the mass ratio of the coal to the activation agent is 1:0.1 to 1:10.

4. The method for preparing graphene according to claim 1, wherein the volume fraction of $H_2$ in the mixed atmosphere of hydrogen and inert atmosphere is 0 to 100%.

5. The method for preparing graphene according to claim 1, wherein the carbonization temperature in the carbonization step is 500° C. to 1200° C. and the carbonization residence time is greater than 0 to 10 h.

6. The method for preparing graphene according to claim 1, wherein the rate of temperature rise in the carbonization step is greater than 0.1 to 15° C./min.

7. The method for preparing graphene according to claim 1, wherein the concentration of the activation agent solution is greater than 0 to 10 mol/L.

8. The method for preparing graphene according to claim 1, wherein the washing step is carried out by using dilute hydrochloric acid or nitric acid, and the concentration of the washing solution is 0.5 mol/L to 2 mol/L.

9. The method for preparing graphene according to claim 1, wherein the drying temperature is 60 to 200° C.

10. The method for preparing graphene according to claim 1, wherein the inert atmosphere is nitrogen or argon.

11. The method for preparing graphene according to claim 1, wherein the coal has a fixed carbon content of 40 to 70%, a volatile content of 20 to 50%, a moisture content of 0 to 30%, an ash content of 0 to 10%; a coal element analysis requires carbon content of 50 to 80%, hydrogen content of 0 to 10%, and oxygen content of 0 to 30%.

12. The method for preparing graphene according to claim 11, wherein the ash in the coal contains one or more of CaO, MgO, $K_2O$, $Na_2O$, $SiO_2$, $Al_2O_3$, $Fe_2O_3$, $TiO_2$, $MnO_2$, $P_2O_5$.

13. The method for preparing graphene according to claim 12, wherein the ash in the coal contains one or more of CaO, MgO, $K_2O$, and $Na_2O$.

14. A graphene material obtained by the method for preparing graphene according to claim 1, having a specific capacitance of from 90 to 180 F/g at a current density of 0.5 A/g when used as a supercapacitor electrode in an organic system.

15. The method for preparing graphene according to claim 1, wherein ammonia is used as an activation agent in the activation step.

* * * * *